(12) United States Patent
Okimura et al.

(10) Patent No.: US 8,191,965 B2
(45) Date of Patent: Jun. 5, 2012

(54) DAMPER AND VEHICLE SEAT EQUIPPED WITH THE DAMPER

(75) Inventors: Akihiko Okimura, Kanagawa (JP);
Yoshiteru Igarashi, Kanagawa (JP);
Naohiro Horita, Kanagawa (JP)

(73) Assignee: Oiles Corporation, Tokyo (JP)

( * ) Notice: Subject to any disclaimer, the term of this patent is extended or adjusted under 35 U.S.C. 154(b) by 421 days.

(21) Appl. No.: 12/430,381

(22) Filed: Apr. 27, 2009

(65) Prior Publication Data
US 2009/0261634 A1  Oct. 22, 2009

(30) Foreign Application Priority Data

Apr. 28, 2008 (JP) .................... 2008-117906

(51) Int. Cl.
*B60N 2/48* (2006.01)
*B60N 2/427* (2006.01)
*F16D 57/02* (2006.01)
(52) U.S. Cl. .................. 297/216.12; 188/294; 188/290
(58) Field of Classification Search ............ 297/216.12, 297/408; 188/280, 290–291, 293–294
See application file for complete search history.

(56) References Cited

U.S. PATENT DOCUMENTS

| | | | | |
|---|---|---|---|---|
| 6,135,561 A * | 10/2000 | Kruger et al. | ................. | 297/408 |
| 6,550,865 B2 * | 4/2003 | Cho | ............... | 297/408 |
| 7,097,242 B2 * | 8/2006 | Farquhar et al. | ........ | 297/216.12 |
| 7,188,894 B2 * | 3/2007 | Humer et al. | ............ | 297/216.13 |
| 7,597,391 B2 * | 10/2009 | Jayasuriya et al. | ...... | 297/216.12 |

FOREIGN PATENT DOCUMENTS

| | | |
|---|---|---|
| JP | 06-033966 | 2/1994 |
| JP | 10-119619 | 5/1998 |
| JP | 10-181403 | 7/1998 |
| JP | 10-311359 | 11/1998 |
| JP | 10-331895 | 12/1998 |
| JP | 11-268566 | 10/1999 |
| JP | 2003-081044 | 3/2003 |

(Continued)

OTHER PUBLICATIONS

JP 10-331895, Dec. 15, 1998, Description of Drawings (Machine Translation), IPDL (Japan Patent Office website), 5 pages.*

(Continued)

*Primary Examiner* — David Dunn
*Assistant Examiner* — Tania Abraham
(74) *Attorney, Agent, or Firm* — Nixon & Vanderhye P.C.

(57) ABSTRACT

A damper 1 includes a vessel 2; a partitioning member 6 which partitions an internal space of the vessel 2 into two accommodation chambers 4 and 5 for accommodating a viscous fluid 3 and which is movable with respect to the vessel 2; a moving force imparting device 7 for imparting to the partitioning member 6 a moving force in an A1 direction by the input of rotation in an R2 direction with respect to the vessel 2, so that the moving velocity is set to one corresponding to the rotating velocity of that input of rotation; a resilient device 8 for resiliently urging the partitioning member 6 in an A2 direction; a communicating hole 9 formed in the partitioning member 6; and a flow limiting device 10 for limiting the flow of the viscous fluid 3 in the accommodating chamber 4 into the accommodating chamber 5 through the communicating hole 9 when the internal pressure of the viscous fluid 3 accommodated in the accommodating chamber 4 has exceeded a fixed value.

16 Claims, 10 Drawing Sheets

| FOREIGN PATENT DOCUMENTS | | |
|---|---|---|
| JP | 2003-176844 | 6/2003 |
| JP | 2003-267108 | 9/2003 |
| JP | 2005-225334 | 8/2005 |
| JP | 2006-082772 | 3/2006 |
| JP | 2006-088875 | 4/2006 |
| WO | WO 2005/095821 A1 | 10/2005 |

OTHER PUBLICATIONS

Microfilm of the specification and drawings annexed to the request of Japanese Utility Model Application No. 12768/1983 (59-123733 Aug. 1984).

* cited by examiner

DAMPER AND VEHICLE SEAT EQUIPPED WITH THE DAMPER

This application claims priority to Japan Application No. 2008-117906 filed Apr. 28, 2008, the entire contents of each of which are hereby incorporated by reference.

BACKGROUND OF THE INVENTION

1. Field of the Invention

The present invention relates to a damper for absorbing an impact, and more particular to a damper suitable for use in a vehicle seat having a headrest for supporting the head of a seated person by moving forward when, at the time of such as a collision of a vehicle, the seated person moves backward due to inertia upon receiving an impact from the rear, as well as a vehicle seat equipped with the damper.

2. Description of the Related Art

Patent Document 1: JP-A-10-181403
Patent Document 2: JP-A-10-119619
Patent Document 3: JP-A-11-268566
Patent Document 4: JP-A-2003-81044
Patent Document 5: JP-A-2003-176844
Patent Document 6: JP-A-2005-225334
Patent Document 7: JP-A-2006-82772
Patent Document 8: JP-A-2006-88875

In vehicles, vehicle seats have been proposed in which a headrest is adapted to move forward to restrict the head of a seated person at the time of such as a collision.

Shock absorbing dampers which are used in such vehicle seats are required to be such that, in the collision at the time of low speed, the impact caused by the collision is absorbed softly in order to support the head so as not to impart the impact, whereas, in the collision at the time of high speed, the impact is absorbed with stiffness corresponding to the magnitude of the impact at the time of the collision so as to absorb the impact due to the collision by becoming stiff in order to support the head reliably.

SUMMARY OF THE INVENTION

The present invention has been devised in view of the above-described aspects, and an object of the invention is to provide a damper capable of softly absorbing an impact when the impact is small, and of becoming stiff and positively holding an impact-absorbed body, e.g., the head, when the impact is large.

Another object of the invention is to provide a vehicle seat equipped with a transmitting mechanism which is capable of positively moving the headrest in the forward direction only at the time of such as a collision by properly discriminating the time of such as a collision and the time of a non-collision, and in which the transmitting mechanism can be compactly installed in a backrest and the like.

In accordance with one aspect of the invention, there is provided a damper comprising: a vessel; a partitioning member which partitions an interior of the vessel into two accommodation chambers for accommodating a viscous fluid in an axial direction of the vessel, and which rotates together with the vessel in a direction about an axis of the vessel and is movable with respect to the vessel in the axial direction of the vessel, the partitioning member having at least one communicating hole formed therein so as to allow the two accommodating chambers inside the vessel to communicate with each other; moving force imparting means for imparting to the partitioning member a moving force in one direction in the axial direction by the input of relative rotation in one direction in the direction about the axis of the vessel with respect to the vessel, so that a moving velocity is set to one corresponding to a rotating velocity of that input of rotation; resilient means for resiliently urging the partitioning member in another direction in the axial direction with respect to the vessel; and flow limiting means for limiting the flow of the viscous fluid in the accommodating chamber on one direction side in the axial direction into the accommodating chamber on another direction side in the axial direction through the communicating hole when the internal pressure of the viscous fluid accommodated in the accommodating chamber on the one direction side in the axial direction has exceeded a fixed value owing to the movement of the partitioning member in the one direction in the axial direction, wherein the flow limiting means includes a variable passage forming member having a through hole which, in an end face in the one direction in the axial direction, is open to the accommodating chamber on the one direction side in the axial direction, and fitted to the partitioning member movably in the axial direction in such a manner as to oppose at an end face thereof in the other direction of the axial direction an end face in the one direction in the axial direction of the partitioning member so as to form a cross-section variable passage communicating with, at one end thereof, the through hole and, at another end thereof, the communicating hole in cooperation with the end face in the one direction in the axial direction of the partitioning member; and an annular elastic member surrounding the cross-section variable passage and disposed between the end face in the other direction of the axial direction of the variable passage forming member and the end face in the one direction in the axial direction of the partitioning member.

According to the damper in accordance with the above-described aspect, in the case of the input of rotation at a low velocity not exceeding a fixed value, the partitioning member is moved in one direction in the axial direction at a low velocity not exceeding the fixed value, and the internal pressure of the viscous fluid accommodated in the accommodating chamber on the one direction side in the axial direction of the vessel does not exceed a fixed value. Therefore, the annular elastic member disposed between the end face in the other direction of the axial direction of the variable passage forming member and the end face in the one direction in the axial direction of the partitioning member is not greatly deformed elastically, and a large passage cross section of the cross-section variable passage is maintained. Thus, the viscous fluid accommodated in the accommodating chamber on the one direction side in the axial direction is allowed to flow into the accommodating chamber on the other direction side through the through hole, the cross-section variable passage, and the communicating hole without much resistance. As a result, a resultant damping force, i.e., a reaction force with respect to the input of rotation, is set to a relatively small value based on the flow resistance in the case where the viscous fluid flows through the through hole, the cross-section variable passage, and the communicating hole. On the other hand, in the case of the input of high-speed rotation exceeding the fixed value, the partitioning member tends to be moved in the one direction in the axial direction at a high velocity exceeding the fixed value, and the internal pressure of the viscous fluid accommodated in the accommodating chamber on the one direction side in the axial direction of the vessel exceeds a fixed value. Therefore, the annular elastic member sandwiched between the end face in the other direction of the axial direction of the variable passage forming member and the end face in the one direction in the axial direction of the partitioning member is deformed elastically. Hence, the axial distance between the end face in the other direction of the axial direction of the variable passage forming member and the end face in the one direction in the axial direction of the partitioning member becomes small, so that the passage cross section of the cross-section variable passage becomes small. Thus, large resistance occurs in the flow of the viscous fluid accommodated in the accommodating chamber on the one direction side in the axial direction of the vessel into the accommodating chamber on the other direction side in the axial direction of the vessel through the through hole, the cross-section variable passage, and the communicating hole. As a result, a resultant damping force, i.e., a reaction force with respect to the input of rotation, assumes a value which is based on the compression resistance of the viscous fluid in the accommodating chamber on the one direction side in the axial direction and the flow resistance of the viscous fluid through the cross-section variable passage having the passage cross section which has become small. Thus, in the case of the input of low-speed rotation not exceeding a fixed value in which case the impact is small, the impact is absorbed softly, whereas in the case of the input of high-speed rotation exceeding the fixed value in which case the impact is large, the damper becomes stiff so as to be able to positively hold the impact-absorbed body.

In a preferred example, the moving force imparting means includes a rotatable member disposed in the vessel rotatably in the direction about the axis of the vessel; and inclined surface means having inclined surfaces which are formed between an end face in the one direction in the axial direction of the rotatable member and the end face in the other direction of the axial direction of the partitioning member opposing that end face in the one direction and which are inclined with respect to the axial direction. In such a moving force imparting means, the inclined surface means includes a plurality of rotatable member projections formed integrally on the end face in the one direction of the rotatable member projectingly in the one direction in the axial direction, and arranged in the direction about the axis, and a plurality of partitioning member projections formed integrally on the end face in the other direction of the partitioning member projectingly in the other direction of the axial direction, and arranged in the direction about the axis so as to mesh with the rotatable member projections. Further, in the case of the inclined surface means, the inclined surfaces are formed on the rotatable member projections and the partitioning member projections, respectively, so as to be brought into sliding contact with each other.

As for the communicating hole, one communicating hole may be used. Alternatively, however, a plurality of communicating holes may be formed in the partitioning member. In this case, the variable passage forming member may have a plate-like portion having the through hole, leg portions formed integrally on the plate-like portion and respectively fitted in the communicating holes, and hook portions which are respectively formed integrally on end portions of the leg portions projecting from the communicating holes so as to prevent the leg portions from coming off the communicating holes.

In another preferred example, the partitioning member has a truncated conical surface in the end face in the one direction in the axial direction, the variable passage forming member has a truncated conical surface which is complementary to the truncated conical surface of the partitioning member and opposes that truncated conical surface, and the cross-section variable passage has a truncated conical passage formed by the truncated conical surface of the partitioning member and the truncated conical surface of the variable passage forming member. In the case of such an example, the truncated conical surface of the partitioning member may have one of a truncated conical recessed surface and a truncated conical projecting surface, while the truncated conical surface of the variable passage forming member may have the other one of the truncated conical recessed surface and the truncated conical projecting surface.

The annular elastic member in a preferred example is constituted by an O-ring formed of natural rubber or synthetic rubber whose modulus of elastic is small at a high temperature (the annular elastic member becomes soft) and large at a low temperature (the annular elastic member becomes hard). The annular elastic member formed such an O-ring undergoes large elastic deformation at high temperature and small elastic deformation at low temperature. As a result, coupled with the synergistic action with the viscous fluid having a positive temperature characteristic concerning fluidity whereby the fluidity increases at high temperature and the fluidity decreases at low temperature, it is possible to reduce the temperature dependence of the flow resistance of the viscous fluid flowing through the cross-section variable passage having a passage cross-sectional area determined by the elastic deformation of the annular elastic member. Thus, it is possible to reduce the difference, for instance, between, on the one hand, the stiffness of the damper in the axial direction in the case of an input of high-speed rotation exceeding a fixed value in which case the impact becomes large at high temperature and, on the other hand, the stiffness of the damper in the axial direction in the case of an input of high-speed rotation exceeding the fixed value in which case the impact becomes large at low temperature. Hence, it becomes possible to positively hold the impact-absorbed body with stiffness which does not differ so much both at high temperature and at low temperature with respect to the axial direction. In the invention, the annular elastic member is not limited to one constituted by an O-ring formed of natural rubber or synthetic rubber, and may be formed of an elastic material such as polyurethane rubber, acrylic rubber, silicone rubber, polyester elastomer, or the like. Furthermore, the annular elastic member may be constituted by a ring or the like whose cross-sectional shape is of a square type, a Y-type, a U-type, a V-type, or an X-type.

As the viscous fluid used in the invention, silicone oil of 100 to 1000 cst is suitable, but is not limited to the same.

In accordance with another aspect of the invention, there is provided a vehicle seat comprising: a backrest of a vehicle; a headrest supported by the backrest movably in a forward direction of the vehicle; movement urging means for urging the headrest to move in the forward direction; and an inhibition mechanism for inhibiting the movement of the headrest in the forward direction; and canceling means for canceling the inhibition by the inhibition mechanism of the movement of the headrest in the forward direction when a moving velocity of a force applied to the backrest in a backward direction of the vehicle has exceeded a fixed value, the canceling means having a load-rotation converting mechanism for converting a load applied to a back receiving portion of the backrest into a rotational force and a transmitting mechanism for transmitting to the inhibition mechanism a force applied to the backrest in the backward direction of the vehicle on the basis of the moving velocity exceeding the fixed value, the transmitting mechanism having the damper according to any one of the above-described forms, wherein one of the vessel and the moving force imparting means of the damper is coupled to the load-rotation converting mechanism so as to receive the rotational force from the load-rotation converting mechanism as an input of rotation, and another one of the vessel and the moving force imparting means of the damper is coupled to the inhibition mechanism so as to transmit to the inhibition mechanism the force applied to the backrest in the backward direction of the vehicle on the basis of the moving velocity exceeding the fixed value.

According to the vehicle seat in accordance with the above-described aspect of the invention, the canceling means, which cancels the inhibition by the inhibition mechanism of the movement of the headrest in the forward direction when a moving velocity of a force applied to the backrest in a backward direction of the vehicle has exceeded a fixed value, has a transmitting mechanism for transmitting to the inhibition mechanism a force applied to the backrest in the backward direction of the vehicle on the basis of the moving velocity exceeding the fixed value. Moreover, since the transmitting mechanism has the damper according to any one of the above-described forms, it is possible to positively move the headrest in the forward direction only at the time of such as a collision by properly discriminating the time of such as a collision and the time of a non-collision, and the transmitting mechanism can be compactly installed in the backrest and the like.

In the vehicle seat in accordance with the invention, the load-rotation converting mechanism may have a load receiving plate supported rotatably by a frame of the backrest and disposed in the back receiving portion of the backrest.

The headrest may be supported by the backrest forwardly rotatably or translatably, the movement urging means may be adapted to urge the headrest to forwardly rotate or translate, and the inhibition mechanism may be adapted to inhibit the rotation or translation of the headrest in the forward direction.

According to the invention, it is possible to provide a damper capable of softly absorbing an impact when the impact is small, and of becoming stiff and positively holding an impact-absorbed body, e.g., the head, when the impact is large. In addition, it is possible to provide a vehicle seat equipped with a damper which is capable of positively moving the headrest in the forward direction only at the time of such as a collision by properly discriminating the time of such as a collision and the time of a non-collision, and in which the transmitting mechanism can be compactly installed in the backrest and the like.

DESCRIPTION OF THE PREFERRED EMBODIMENTS

Figure 1:
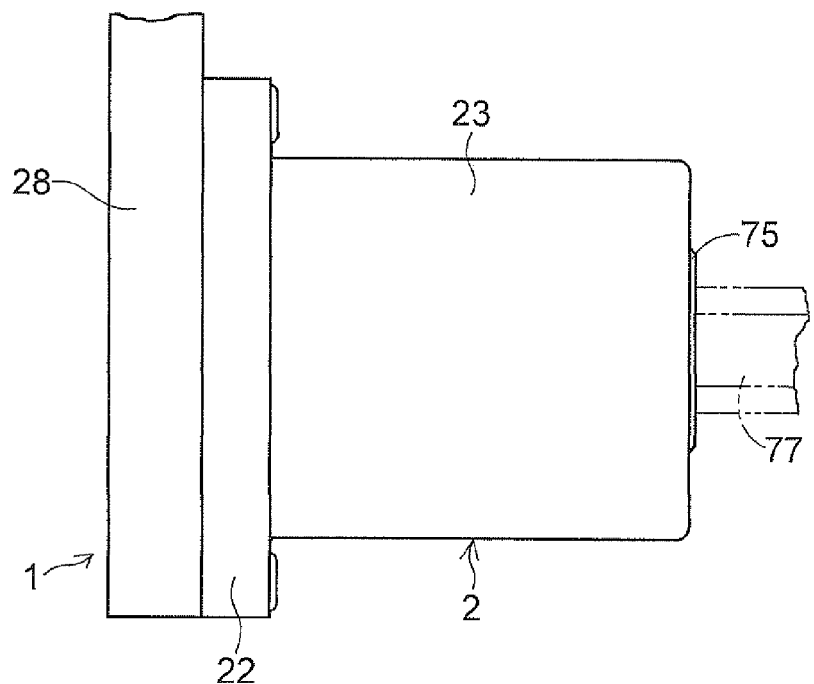
FIG. 1 is an explanatory side elevational view of a preferred embodiment of the invention.
Figure 2:
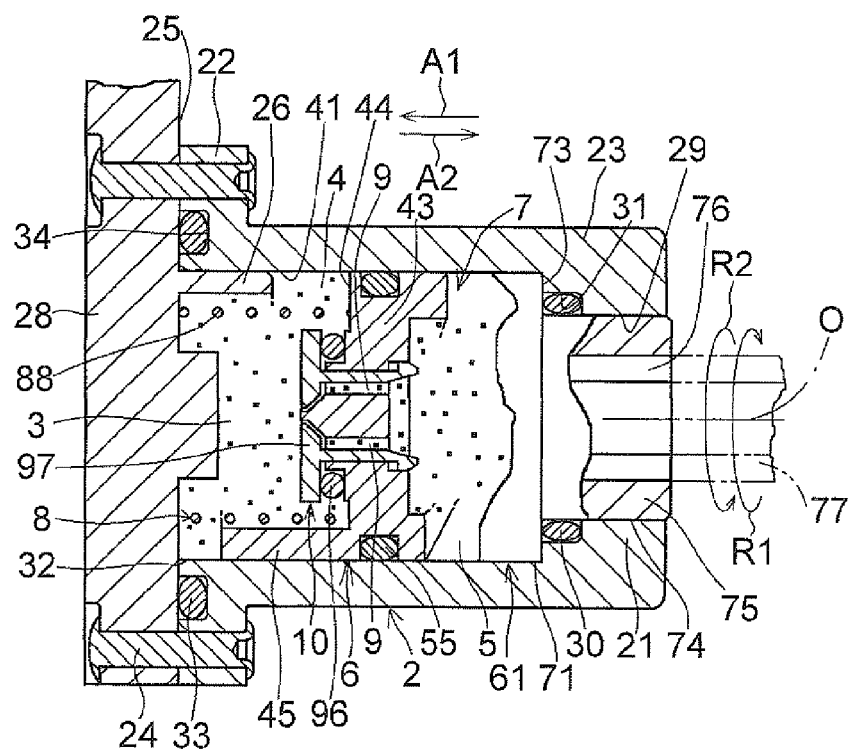
FIG. 2 is an explanatory side cross-sectional view of the embodiment shown in FIG. 1.
Figure 3:
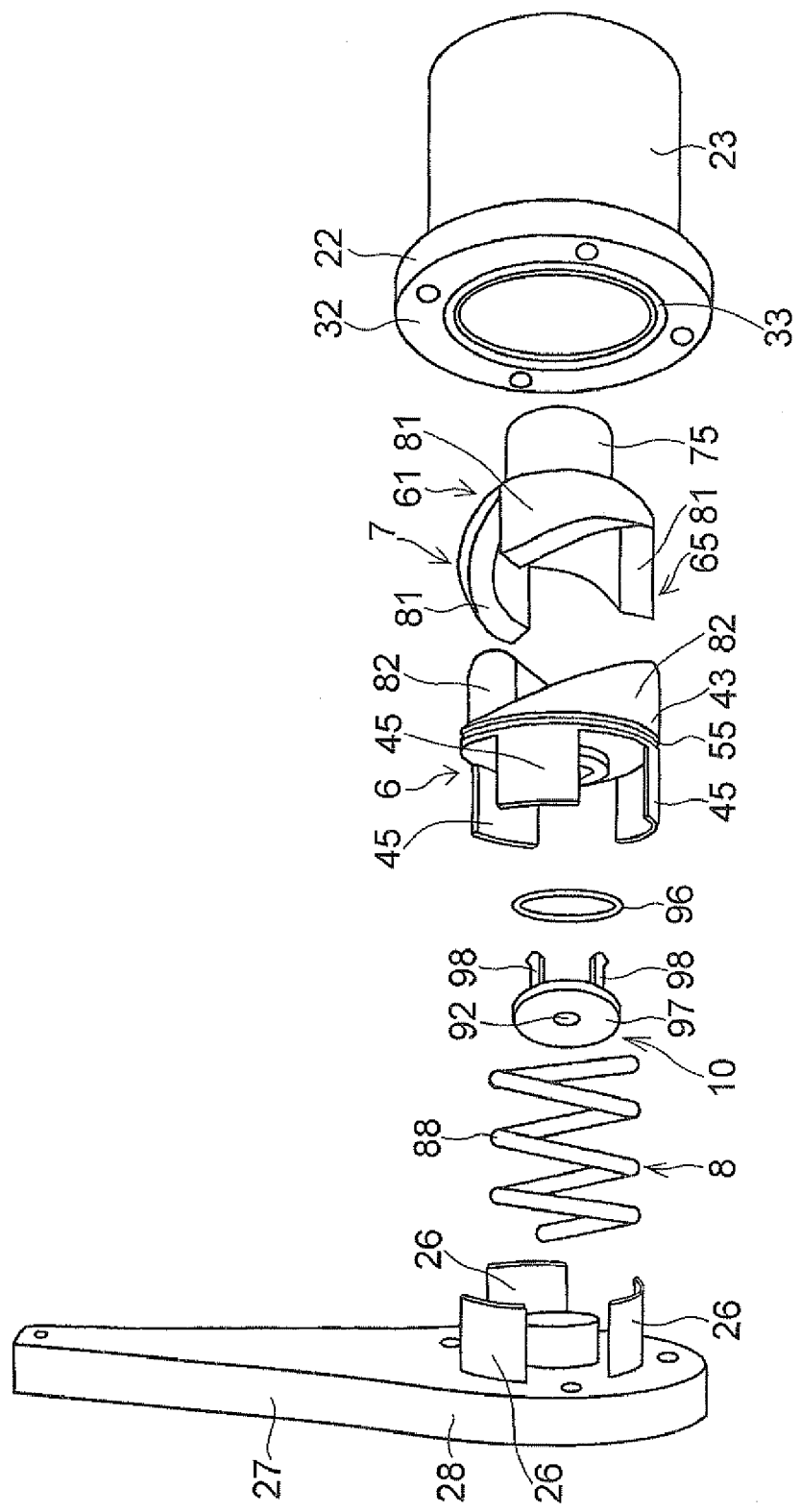
FIG. 3 is an explanatory exploded view of the embodiment shown in FIG. 1.
Figure 4:
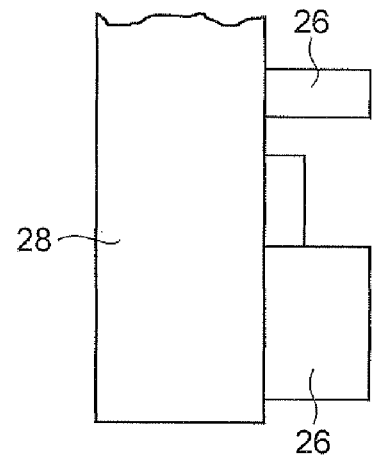
FIG. 4 is an explanatory partial enlarged view of a vessel in the embodiment shown in FIG. 1.
Figure 5:
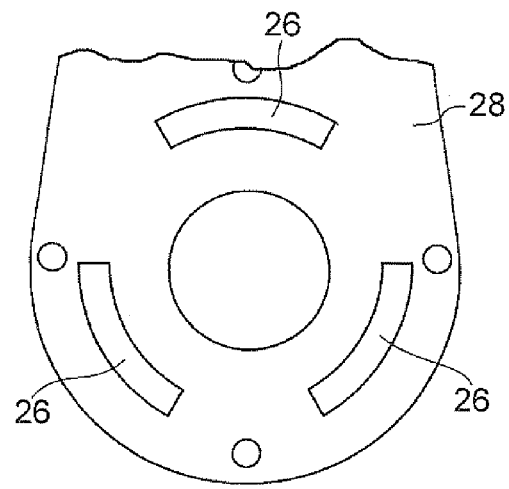
FIG. 5 is an explanatory partial right side elevational view of the vessel shown in FIG. 4.

Hereafter, a more detailed description will be given of the mode for carrying out the invention with reference to the preferred embodiment shown in the drawings. It should be noted that the present invention is not limited to such an embodiment.

In FIGS. 1 to 5, a damper 1 in accordance with this embodiment is comprised of a vessel 2; a partitioning member 6 which partitions an internal space of the vessel 2 into two accommodation chambers 4 and 5 for accommodating a viscous fluid 3 in an A1-A2 direction, i.e., in an axial direction of that vessel 2, and which rotates together with the vessel 2 in an R1-R2 direction, i.e., in a direction about an axis O of the vessel 2 and is movable with respect to the vessel 2 in the A1-A2 direction, i.e., in the axial direction of the vessel 2; a moving force imparting means 7 for imparting to the partitioning member 6 a moving force in an A1 direction, i.e., one direction in the A1-A2 direction, by the input of relative rotation in an R2 direction, i.e., one direction in the R1-R2 direction, with respect to the vessel 2, so that the moving velocity is set to one corresponding to the rotating velocity of that input of rotation; a resilient means 8 for resiliently urging the partitioning member 6 in an A2 direction which is the other direction in the A1-A2 direction; two communicating holes 9 formed in the partitioning member 6 so as to allow the two accommodating chambers 4 and 5 inside the vessel 2 to communicate with each other; and a flow limiting means 10 for limiting the flow of the viscous fluid 3 in the accommodating chamber 4 on the A1 direction side into the accommodating chamber 5 on the A2 direction side through the communicating holes 9 when the internal pressure of the viscous fluid 3 accommodated in the accommodating chamber 4 on the A1 direction side has exceeded a fixed value owing to the movement of the partitioning member 6 in the A1 direction.

The vessel 2 includes a hollow cylindrical portion 23 integrally having an inside diameter-side collar portion 21 at its end in the A2 direction and an outside diameter-side collar portion 22 at its end in the A1 direction, respectively, as well as a closure member 28 with an arm portion 27, the outside diameter-side collar portion 22 of the hollow cylindrical portion 23 being secured to the closure member 28 by rivets or screws 24, the closure member 28 integrally having on its end 25 in the A2 direction a plurality of projections projecting in the A2 direction, i.e., in this embodiment three semicylindrical projections 26 arranged at equiangular intervals in the R1-R2 direction, respectively.

An annular notch 31 for accommodating a seal ring 30 constituted by an O-ring is formed at an end portion in the A1 direction of a cylindrical inner peripheral surface 29 of the inside diameter-side collar portion 21. Meanwhile, an annular groove 34 for accommodating a seal ring 33, which is constituted by an O-ring and adapted to be brought into resilient contact with the end face 25, is formed in an end face 32 in the A1 direction of the outside diameter-side collar portion 22.

As shown in particular detail in FIGS. 7 to 10, the partitioning member 6 includes a disk-shaped body 43 having a cylindrical outer peripheral surface 42 which is brought into contact movably in the A1-A2 direction with a cylindrical inner peripheral surface 41 of the hollow cylindrical portion 23; a plurality of, in this embodiment three, semicylindrical projections 45 projecting integrally in the A1 direction from a radially outer edge of an end face 44 in the A1 direction of the disk-shaped body 43, and arranged at equiangular intervals in the R1-R2 direction so as to mesh with the three projections 26 without gaps in the R1-R2 direction; a large-diameter disk-shaped portion 46 projecting in the A1 direction integrally from the end face 44 in the A1 direction of the disk-shaped body 43; a small-diameter disk-shaped portion 48 projecting in the A1 direction integrally from an end face 47 in the A1 direction of the disk-shaped portion 46; a truncated conical portion 51 projecting in the A1 direction integrally from an end face 49 in the A1 direction of the disk-shaped portion 48 and having a truncated conical surface 50; and a columnar projection 52 projecting in the A1 direction integrally from a projecting end in the A1 direction of the truncated conical portion 51. Thus, an end face 54 in the A1 direction of the partitioning member 6 has the end face 44, the end face 47, the end face 49, and the truncated conical surface 50.

The disk-shaped body 43 has in its outer peripheral surface 42 an annular groove 56 to which a seal ring 55 constituted by an O-ring and adapted to be brought into resilient contact with the inner peripheral surface 41, and has in its end face 58 in the A2 direction a cylindrical recess 57 which is open to the accommodating chamber 5. The respective communicating holes 9, which are formed in the disk-shaped body 43, the disk-shaped portion 46, and the disk-shaped portion 48 of the partitioning member 6 in such a manner as to oppose each other in the radial direction, are open at their one ends in the A1 direction in the end face 49 of the disk-shaped portion 48, and are open at their other ends in the A2 direction in a depressed end face 59 of the disk-shaped body 43 defining the bottom surface of the recess 57, to thereby communicate with the accommodating chamber 5 through the recess 57.

The partitioning member 6 is disposed in the vessel 2 movably in the A1-A2 direction relative to the vessel 2 and immovably in the R1-R2 direction relative to the vessel 2, i.e., so as to rotate in the same direction in conjunction with the rotation of the vessel 2 in the R1-R2 direction without rotating in the R1-R2 direction relative to the vessel 2. The partitioning member 6 defines the accommodating chamber 4 on the A1 direction side in the internal space of the vessel 2 in cooperation with the closure member 28.

As shown in particular detail in FIGS. 7, 9, and 10 to 13, the moving force imparting means 7 includes a rotatable member 61 disposed in the internal space of the vessel 2 rotatably in the R1-R2 direction relative to the vessel 2; and an inclined surface means 65 having pluralities of, i.e., in this embodiment respectively three, inclined surfaces 63 and 64 which are formed between an end face 62 in the A1 direction of the rotatable member 61 and the end face 58 in the A2 direction of the partitioning member 6 opposing that end face 62 and which are inclined with respect to the A1-A2

Figure 11:
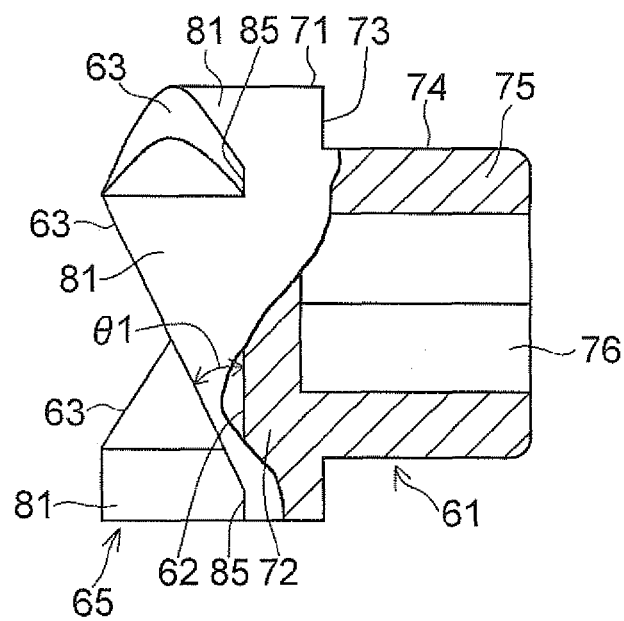
FIG. 11 is an explanatory partial enlarged view of a moving force imparting means and the like shown in FIG. 2.
Figure 12:
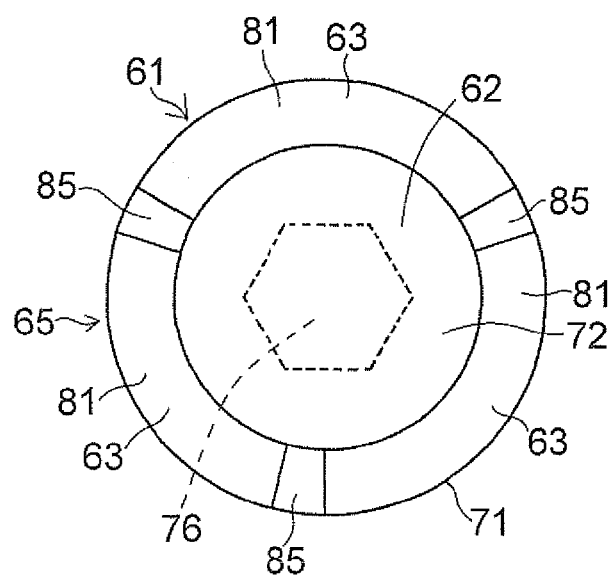
FIG. 12 is an explanatory left side elevational view of the moving force imparting means and the like shown in FIG. 11.
Figure 13:
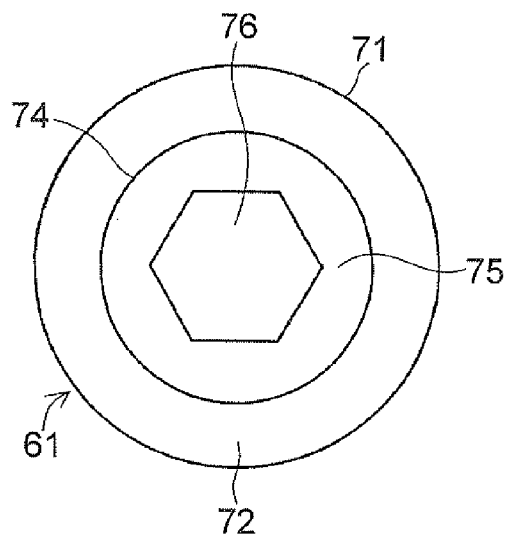
FIG. 13 is an explanatory right side elevational view of the moving force imparting means and the like shown in FIG. 11.

As shown in particular detail in FIGS. 11 to 13, the rotatable member 61 includes a large-diameter disk-shaped body 72 having a cylindrical outer peripheral surface 71 which is brought into contact with the cylindrical inner peripheral surface 41 of the hollow cylindrical portion 23 rotatably in the R1-R2 direction, as well as a small-diameter annular portion 75 having a cylindrical outer peripheral surface 74 which projects integrally from a central portion of its end face in the A2 direction of the disk-shaped body 72 and is brought into contact with the inner peripheral surface 29 of the inside diameter-side collar portion 21 rotatably in the R1-R2 direction. The rotatable member 61 defines the accommodating chamber 5 inside the vessel 2 in cooperation with the partitioning member 6 and is adapted to not move in the A2 direction by coming into contact with the inside diameter-side collar portion 21 at its end face 73 rotatably in the R1-R2 direction, the seal ring 30 being in resilient contact with the outer peripheral surface 74 of the annular portion 75 and the end face 73 of the disk-shaped body 72.

The disk-shaped body 72 and the annular portion 75 have in their central portions a hexagonal bottomed groove 76. A sectionally hexagonal rotating shaft 77 is adapted to be fitted in the bottomed groove 76, and the input of relative rotation in the R1-R2 direction with respect to the vessel 2 is adapted to be applied to the rotatable member 61 by the rotating shaft 77.

As shown in particular detail in FIGS. 7 and 9 to 12, the inclined surface means 65 includes a plurality of, i.e., in this embodiment three, rotatable member projections 81 formed integrally on the end face 62 of the disk-shaped body 72 of the rotatable member 61 projectingly in the A1 direction, and arranged at equiangular intervals in the R1-R2 direction, as well as a plurality of, i.e., in this embodiment three, partitioning member projections 82 formed integrally on the end face 58 of the disk-shaped body 43 of the partitioning member 6 projectingly in the A2 direction, and arranged at equiangular intervals in the R1-R2 direction so as to mesh with the rotatable member projections 81.

Each rotatable member projection 81 has a bottom surface 85 perpendicular to the A1-A2 direction and flush with the end face 62 as well as the inclined surface 63 extending from the bottom surface 85 in an R1 direction (counterclockwise in FIG. 12) with an angle $\theta 1$. Meanwhile, each partitioning member projection 82 has an apex surface 86 perpendicular to the A1-A2 direction and in contact with the bottom surface 85 as well as the inclined surface 64 extending from the apex surface 86 in the R1 direction (clockwise in FIG. 9) with an angle $\theta 2$ and in contact with the corresponding inclined surface 63. Thus, the inclined surfaces 63 and 64 are respectively formed on the rotatable member projections 81 and the partitioning member projections 82 so as to be brought into sliding contact with each other in the R1-R2 direction.

Figure 16:
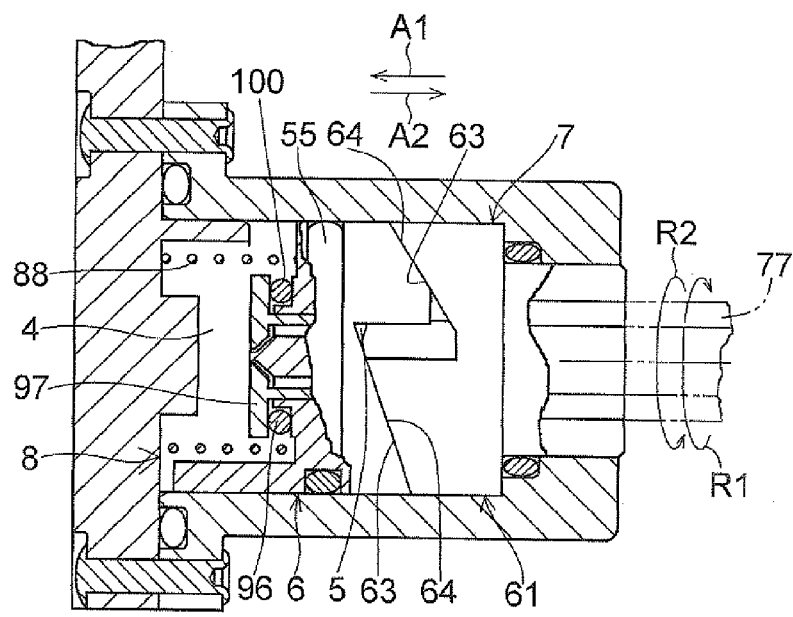
FIG. 16 is another diagram explaining the operation of the embodiment shown in FIG. 1.

When the rotatable member 61 is rotated in the same R2 direction by the input of rotation in the R2 direction from the rotating shaft 77, the moving force imparting means 7 presses the inclined surfaces 64 in the A1 direction while sliding on the inclined surfaces 64 at their inclined surfaces 63 rotating in the R2 direction, as shown in FIG. 16, to move the partitioning member 6 in the A1 direction against the resiliency from the resilient means 8. On the other hand, when the input of rotation in the R2 direction from the rotating shaft 77 is canceled, the inclined surfaces 64 are pressed against the inclined surfaces 63 in the A2 direction by the resiliency from the resilient means 8 through the partitioning member 6, thereby allowing the inclined surfaces 63 to rotate in the R1 direction while sliding on the inclined surfaces 64. As a result, the apex surfaces 86 are brought into contact with the bottom surface 85, so that the partitioning member 6 is returned to its original moving position, while the rotatable member 61 is returned to its original rotating position. Thus, the moving force in the A1 direction is adapted to be imparted to the partitioning member 6 by the input of relative rotation in the R2 direction with respect to the vessel 2, so that the moving velocity is set to one corresponding to the rotating velocity in the R2 direction of the input of the rotation.

The resilient means 8 has a coil spring 88 disposed between the end face 25 of the closure member 28 and the end face 44 of the disk-shaped body 43 in such a manner as to be compressed with its ends in contact with these end faces 25 and 44 and to surround the disk-shaped portion 46 and the disk-shaped portion 48. The disk-shaped body 43 is urged in the A2 direction by the resiliency of the coil spring 88 to thereby impart a rotating returning force in the R1 direction to the rotatable member 61 of the moving force imparting means 7.

Figure 6:
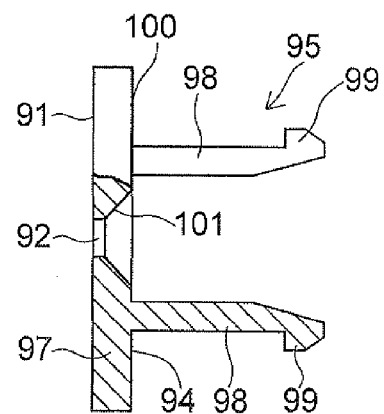
FIG. 6 is an explanatory enlarged view of a variable passage forming member shown in FIG. 2.
Figure 7:
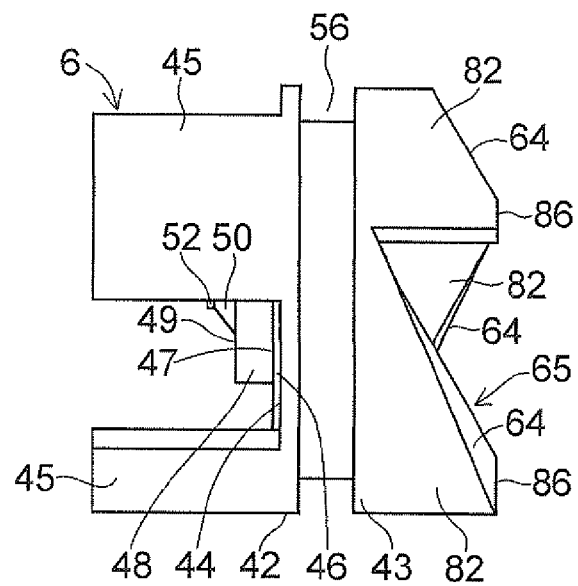
FIG. 7 is an explanatory enlarged view of a partitioning member and the like shown in FIG. 2.
Figure 8:
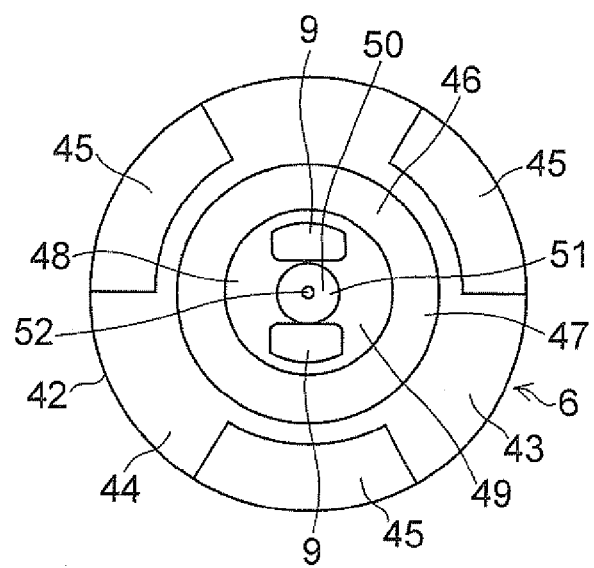
FIG. 8 is an explanatory left side elevational view of the partitioning member and the like shown in FIG. 7.
Figure 9:
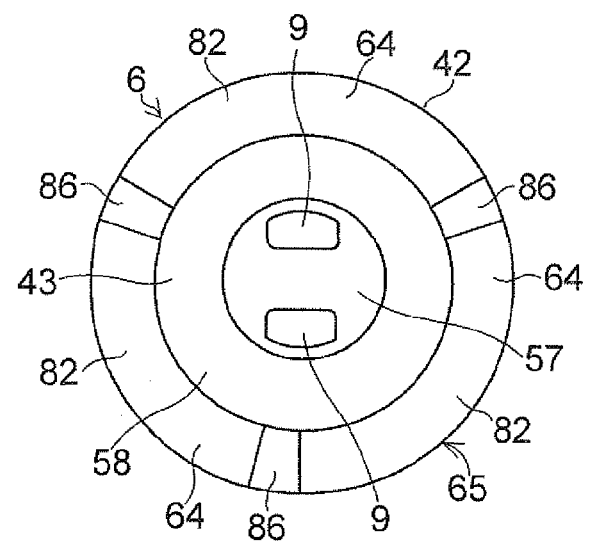
FIG. 9 is an explanatory right side elevational view of the partitioning member and the like shown in FIG. 7.
Figure 10:
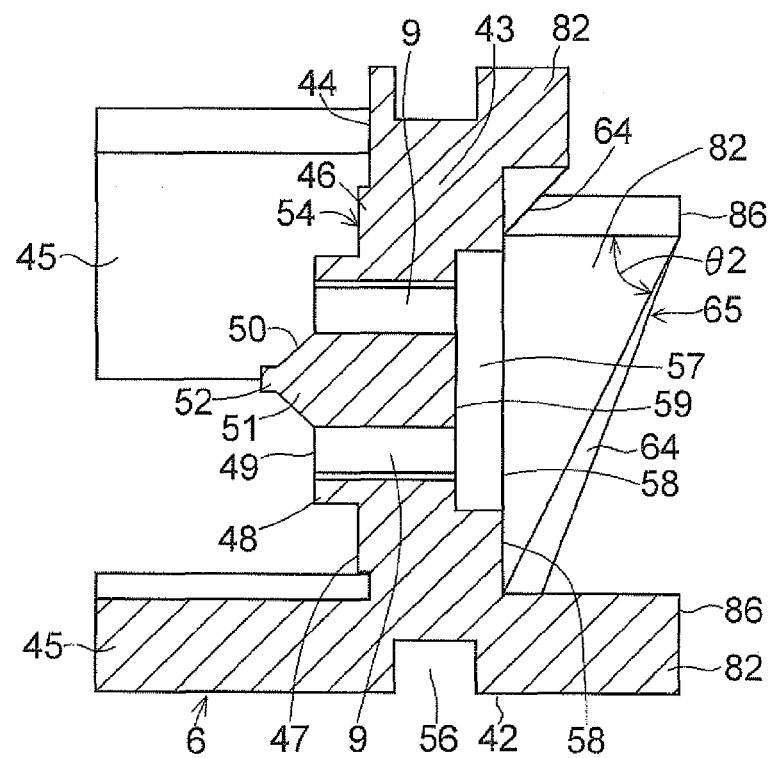
FIG. 10 is an explanatory enlarged cross-sectional view of the partitioning member and the like shown in FIG. 2.
Figure 14:
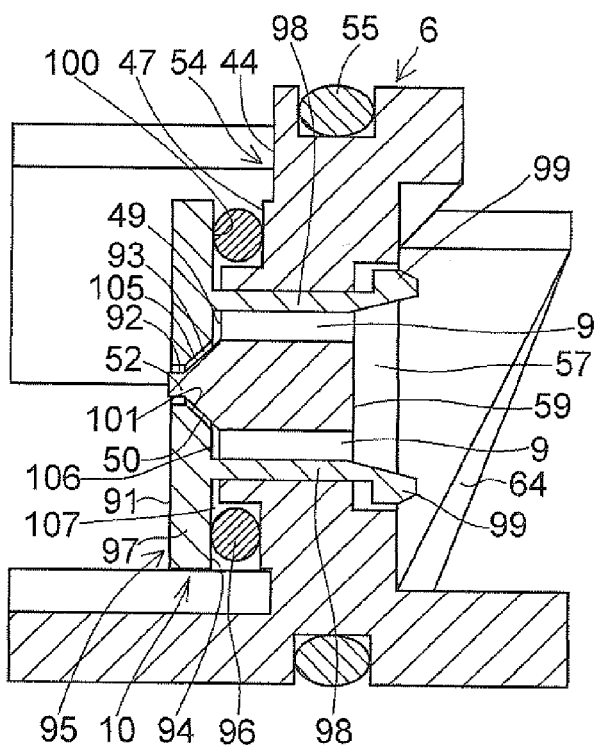
FIG. 14 is an explanatory enlarged cross-sectional view of the partitioning member, the variable passage forming member, and the like shown in FIG. 2.

As shown in particular detail in FIGS. 6 and 14, the flow limiting means 10 includes a variable passage forming member 95 having a through hole 92 which, in an end face 91 in the A1 direction, is open to the accommodating chamber 4 on the A1 direction side, and fitted to the partitioning member 6 movably in the A1-A2 direction in such a manner as to oppose at an end face 94 in the A2 direction the end face 47, the end face 49, and the truncated conical surface 50 of the end face 54 in the A1 direction of the partitioning member 6 so as to form a cross-section variable passage 93 communicating with, at one end thereof, the through hole 92 and, at the other end thereof the communicating holes 9 in cooperation with the end face 47, the end face 49, and the truncated conical surface 50 of the end face 54 in the A1 direction of the partitioning member 6; and an annular elastic member 96 constituted by an O-ring or the like and surrounding the cross-section variable passage 93, the annular elastic member 96 being disposed between the end face 94 in the A2 direction of the variable passage forming member 95 and the end face 47 of the end face 54 in the A1 direction of the partitioning member 6.

Figure 15:
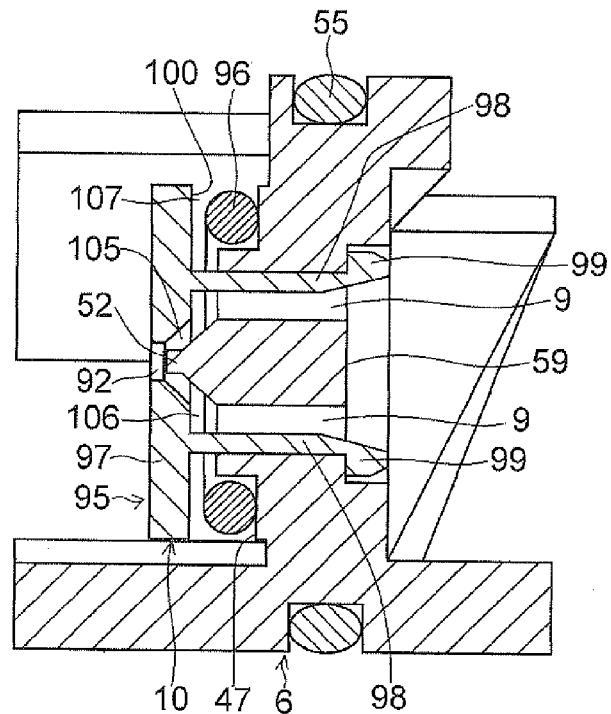
FIG. 15 is a diagram explaining the operation of the embodiment shown in FIG. 1.

The variable passage forming member 95 has a circular plate-like portion 97 having the through hole 92 with the columnar projection 52 disposed therein; a pair of leg portions 98 formed integrally on the plate-like portion 97 in such a manner as to extend in the A2 direction, the pair of leg portions 98 being respectively fitted in the communicating holes 9; and hook portions 99 which are respectively formed integrally on end portions of the leg portions 98 projecting from the communicating holes 9 and are engaged with the depressed end face 59, as shown in FIG. 15, so as to prevent the leg portions 98 from coming off the communicating holes 9 in the A1 direction.

The end face 94 has an annular flat surface 100 with which the leg portions 98 are integrally formed and which are brought into contact with the annular elastic member 96 radially outwardly of the leg portions 98; and a truncated conical surface 101 which is surrounded by the flat surface 100, is complementary to the truncated conical surface 50 of the partitioning member 6, and opposes that truncated conical surface 50.

The cross-section variable passage 93 has a truncated conical passage 105 formed by the truncated conical surface 50 of the partitioning member 6 and the truncated conical surface 101 of the variable passage forming member 95; an inner annular passage 106 communicating with the truncated conical passage 105 and formed by the end face 49 of the partitioning member 6 and the flat surface 100; and outer annular passage 107 communicating with the inner annular passage 106 and formed by the end face 47 of the partitioning member 6 and the flat surface 100. The truncated conical passage 105 communicates with the accommodating chamber 4 through an annular gap between the columnar projection 52 disposed in the through hole 92 and the plate-like portion 97 in that through hole 92, and the inner annular passage 106 communicates with the communicating holes 9, while the outer annular passage 107 at its radially outer edge communicates with the accommodating chamber 4 when the contact of the flat surface 100 with the annular elastic member 96 is canceled, as shown in FIG. 15.

The annular elastic member 96 is constituted by an O-ring formed of natural rubber or synthetic rubber whose modulus of elastic is small at a high temperature (the annular elastic member becomes soft) and large at a low temperature (the annular elastic member becomes hard).

In the slow, low-speed movement in the A1 direction of the partitioning member 6 in which the internal pressure of the viscous fluid 3 in the accommodating chamber 4 is not very large relative to the internal pressure of the viscous fluid 3 in the accommodating chamber 5, i.e., in the input of relative low-speed rotation in the R2 direction from the rotating shaft 77, the flow limiting means 10 causes the flat surface 100 to be brought into pressing contact with the annular elastic member 96 being in contact with the end face 47, to such an extent that the annular elastic member 96 is not greatly deformed elastically in its cross section diameter owing to the internal pressure of the viscous fluid 3 in the accommodating chamber 4, as shown in FIG. 16, to thereby block the outer annular passage 107 and hamper the communication of the accommodating chamber 4 with the accommodating chamber 5 through the outer annular passage 107. Meanwhile, the accommodating chamber 4 is communicated with the accommodating chamber 5 through the truncated conical passage 105 and the inner annular passage 106 each having a passage cross section determined by the cross section diameter of the annular elastic member 96 which has not been greatly deformed elastically in its cross section diameter, as well as the annular gap between the columnar projection 52 and the plate-like portion 97 in the through hole 92, the communicating holes 9, and the recess 57. A small resisting force is thus generated for the slow movement of the partitioning member 6 in the A1 direction by allowing the flow of the viscous fluid 3 from the accommodating chamber 4 into the accommodating chamber 5 by the above-described communication.

In the high-speed movement in the A1 direction of the partitioning member 6 in which the internal pressure of the viscous fluid 3 in the accommodating chamber 4 becomes extremely large relative to the internal pressure of the viscous fluid 3 in the accommodating chamber 5, i.e., in the input of relative high-speed rotation in the R2 direction from the rotating shaft 77, the flow limiting means 10 causes the plate-like portion 97 of the variable passage forming member 95 to press against the annular elastic member 96 so as to allow the annular elastic member 96 to be greatly deformed elastically in its cross section diameter. The truncated conical passage 105 and the inner annular passage 106 are thereby narrowed to reduce their passage cross-sectional areas. The accommodating chamber 4 is communicated with the accommodating chamber 5 through the truncated conical passage 105 and the inner annular passage 106 with their passage cross-sectional areas thus reduced. A large resisting force is thus generated for the high-speed movement of the partitioning member 6 in the A1 direction by causing the flow of the viscous fluid 3 from the accommodating chamber 4 into the accommodating chamber 5 with large resistance owing to the above-described communication. Furthermore, in the rotation in the R2 direction of the rotatable member 61 due to the input of relative rotation at an even higher speed in the R2 direction from the rotating shaft 77, the annular elastic member 96 in its cross section diameter is even more greatly crushed and deformed elastically by the elastic crushing of the annular elastic member 96 by the plate-like portion 97 of the variable passage forming member 95. Thus, passage cross-sectional areas of the truncated conical passage 105 and the inner annular passage 106 are set to extremely small values which are determined by the cross section diameter of the annular elastic member 96 which has been crushed and deformed, thereby reducing the flow of the viscous fluid 3 in the accommodating chamber 4 into the accommodating chamber 5 to a substantially extremely small degree and substantially stopping the above-described high-speed rotation through the partitioning member 6. Hence, the rotation of the impact-absorbed body which tends to rotate the rotating shaft 77 at high speed is stopped, thereby positively holding the impact-absorbed body.

When the input of relative rotation in the R2 direction from the rotating shaft 77 ceases after the movement of the partitioning member 6 in the A1 direction, as shown in FIG. 16, in the flow limiting means 10, the partitioning member 6 begins to be conversely moved in the A2 direction by the resiliency of the coil spring 88. In this movement, the variable passage forming member 95 is relatively moved in the A1 direction with respect to the partitioning member 6, as shown in FIG. 15. As a result, the communication between the outer annular passage 107 and the accommodating chamber 4 is recovered, and the truncated conical passage 105 and the inner annular passage 106 each having a large passage cross section are formed, thereby causing the flow of the viscous fluid 3 from the accommodating chamber 4 into the accommodating chamber 5 with small resistance. Hence, the partitioning member 6 is speedily moved in the A2 direction with such a small resisting force, and the rotatable member 61 is returned to its initial position in which the respective apex surfaces 86 are in contact with the respective corresponding bottom surfaces 85.

The annular elastic member 96 made of natural rubber or synthetic rubber having a small modulus of elasticity at high temperature and a large modulus of elasticity at low temperature undergoes large elastic deformation at high temperature and small elastic deformation at low temperature. Therefore, coupled with the synergistic action with the viscous fluid 3 having a positive temperature characteristic concerning fluidity whereby the fluidity increases at high temperature and the fluidity decreases at low temperature, it is possible to reduce the temperature dependence of the flow resistance of the viscous fluid flowing through the cross-section variable passage 93 having a passage cross-sectional area determined by the elastic deformation of the annular elastic member 96. Thus, it is possible to reduce the difference, for instance, between, on the one hand, the stiffness of the damper 1 in the A2 direction in the case of an input of high-speed rotation exceeding a fixed value in which case the impact becomes large at high temperature and, on the other hand, the stiffness of the damper 1 in the A2 direction in the case of an input of high-speed rotation exceeding the fixed value in which case the impact becomes large at low temperature. Hence, it becomes possible to positively hold the impact-absorbed body with stiffness which does not differ so much both at high temperature and at low temperature with respect to the A2 direction.

Figure 17:
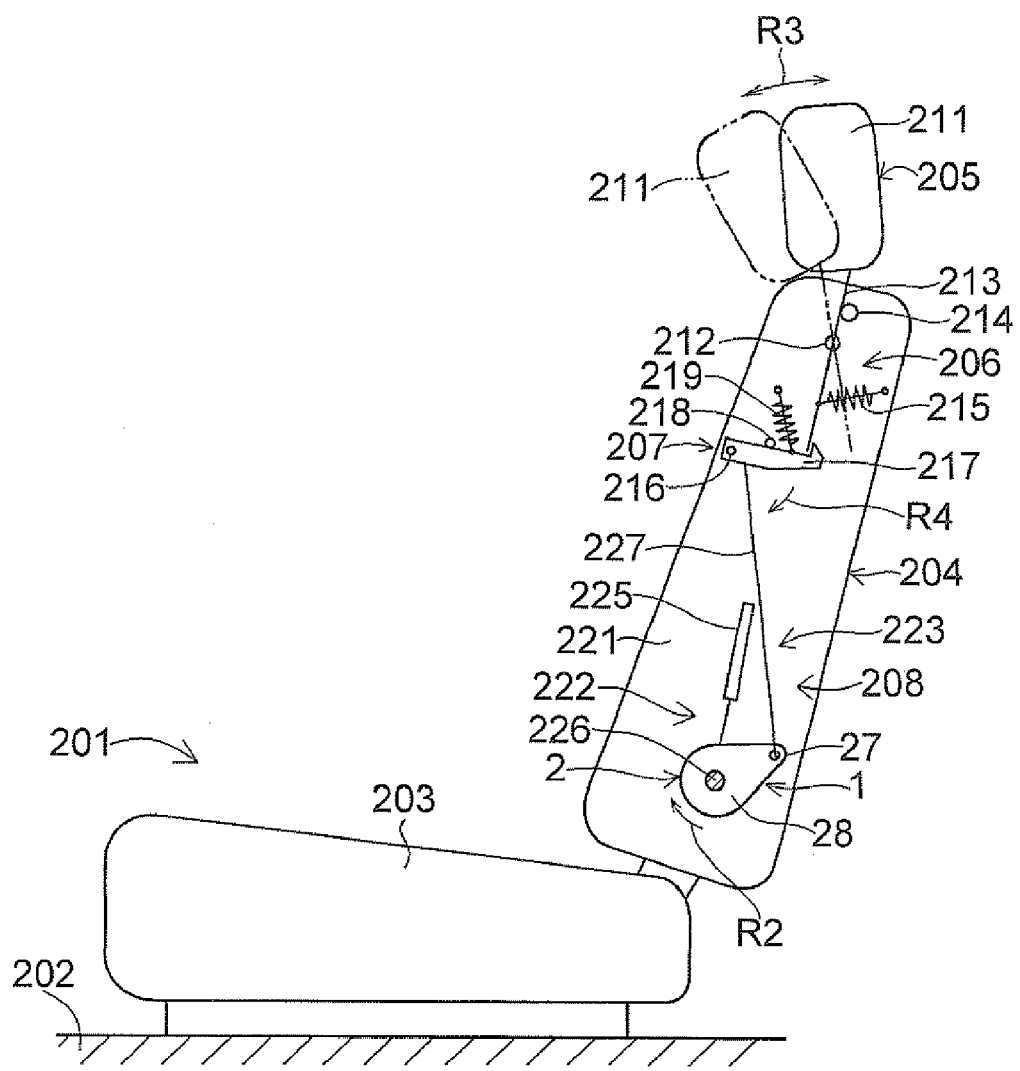
FIG. 17 is an explanatory side elevational view of an embodiment in which the embodiment shown in FIG. 1 is used in a vehicle seat.
Figure 18:
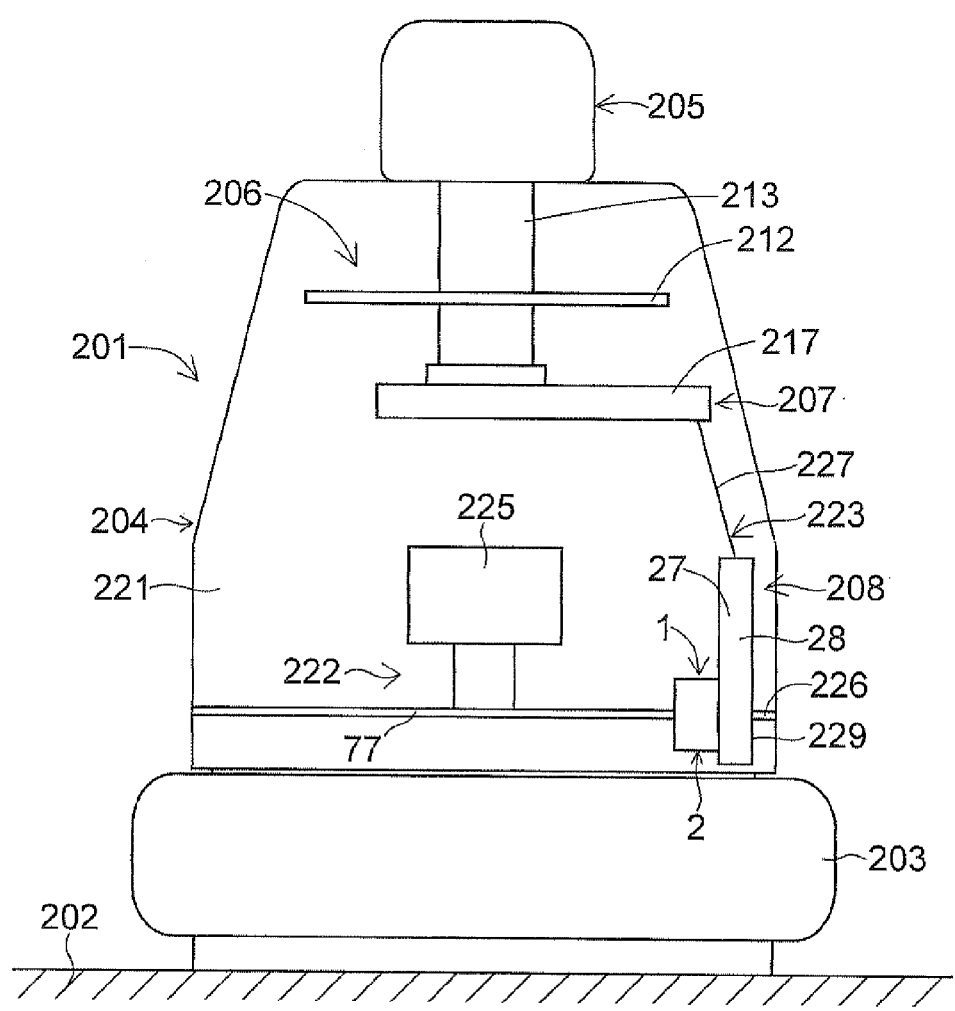
FIG. 18 is an explanatory front elevational view of the embodiment shown in FIG. 17

The above-described damper 1 may be used for a vehicle seat 201, as shown in FIGS. 17 and 18. Namely, the vehicle seat 201 in accordance with this embodiment is comprised of a seat 203 mounted on a floor 202 of a vehicle such that its front-back position and inclined position are adjustable; a vehicle backrest 204 installed to the seat 203 such that its inclined position is adjustable; a headrest 205 supported by the backrest 204 movably in the forward direction, i.e., rotatably in a forward R3 direction in this embodiment; a rotatively urging means 206 for rotatively urging the headrest in the forward R3 direction; and an inhibition mechanism 207 for inhibiting the rotation of the headrest 205 in the R3 direction; and a canceling means 208 for canceling the inhibition by the inhibition mechanism 207 of the movement of the headrest 205 in the R3 direction when the moving velocity of the force applied to the backrest 204 in the backward direction of the vehicle has exceeded a fixed value.

Since the mechanism of mounting the seat 203 on the floor 202 such that its front-back position and inclined position are adjustable and the mechanism of installing the backrest 204 to the seat 203 such that its inclined position is adjustable are publicly known, a detailed description thereof will be omitted.

The headrest 205 has a headrest body 211 and a supporting member 213 which is secured to the headrest body 211 and is supported by a frame (not shown) of the backrest 204 rotatably in the R3 direction by means of a shaft 212. The supporting member 213 is adapted to not rotate in an opposite direction to the R3 direction by a stopper 214 secured to the frame of the backrest 204.

The rotatively urging means 206 serving as a movement urging means has a coil spring 215 having one end secured to the frame of the backrest 204 and the other end secured to the supporting member 213, so as to constantly urge the headrest 205 rotatively in the R3 direction by the resiliency of the coil spring 215.

The inhibition mechanism 207 has a hook member 217 which is supported by a frame of the backrest 204 by means of a shaft 216 rotatably in an R4 direction and abuts against and engages a leading end of the supporting member 213 so as to inhibit the rotation of the supporting member 213 in the R3 direction, as well as a stopper 218 and a coil spring 219 for setting the hook member 217 to an abutting and engaging position with respect to the leading end of the supporting member 213.

The canceling means 208 has a load-rotation converting mechanism 222 which is displaced by the load applied to a back receiving portion 221 of the backrest 204 from an occupant seated in the seat 203 and a transmitting mechanism 223 which transmits to the inhibition mechanism 207 a force applied to the back receiving portion 221 of the backrest 204 in the backward direction of the vehicle on the basis of its velocity exceeding a fixed value, but which does not transmit to the inhibition mechanism 207 the force applied to the back receiving portion 221 of the backrest 204 on the basis of its velocity of the fixed value or less.

The load-rotation converting mechanism 222 has the rotating shaft 77 supported rotatably by the frame of the backrest 204 and a load receiving plate 225 secured to the rotating shaft 77 and disposed in the back receiving portion 221 of the backrest 204. The load receiving plate 225 supported rotatably by the frame of the backrest 204 by means of the rotating shaft 77 is embedded in a cushion in the back receiving portion 221 of the backrest 204.

The transmitting mechanism 223 has a supporting shaft 226 supported by the frame of the backrest 204, the damper 1 supported at the closure member 28 of the vessel 2 by the supporting shaft 226 rotatably in the R1-R2 direction, and a wire 227 having one end coupled to the arm member 27 of the damper 1 and the other end coupled to the hook member 217.

In the damper 1 in accordance with this embodiment, a recess for receiving one end of the supporting shaft 226 is formed in the other end face 229 of the closure member 28, and the vessel 2 of the damper 1 is supported by the frame of the backrest 204 rotatably about the supporting shaft 226 in the R1-R2 direction. The rotating shaft 77 having a hexagonal cross section is fitted in the hexagonal bottomed groove 76 in the central portions of the disk-shaped body 72 and the annular portion 75. Thus, the vessel 2 of the damper 1 is semi-fixed by the resiliency of the coil spring 219 by means of the wire 227 and the hook member 217 in the R2 direction.

In the above-described vehicle seat 201, in a case where the occupant is seated in the seat 203 and the occupant's normal load is applied to the backrest 204 in the backward direction of the vehicle, or in a case where the occupant's load is added to the backrest 204 in the backward direction of the vehicle due to the normal acceleration of the vehicle for the occupant seated in the seat 203, these loads upon the backrest 204 are applied slowly at a velocity of a fixed value or less. As a result, the load receiving plate 225 which receives such a load of the occupant is rotated slowly about the rotating shaft 77 in the R2 direction without causing the vessel 2 semi-fixed with respect to the rotation in the R2 direction by the resiliency of the coil spring 219 to produce rotation in the R2 direction. This slow rotation of the load receiving plate 225 produces slow flow of the viscous fluid 3 from the accommodating chamber 4 into the accommodating chamber 5 through the truncated conical passage 105 and the inner annular passage 106 each having a passage cross section determined by the cross section diameter of the annular elastic member 96 which has not been greatly deformed elastically, as well as the annular gap between the columnar projection 52 and the plate-like portion 97 in the through hole 92, the communicating holes 9, and the recess 57. In consequence, the load receiving plate 225 and, hence, the backrest 204 are subjected to a moderate impact. Meanwhile, in such slow rotation of the load receiving plate 225, the rotatable member 61 is idled in the R2 direction with respect to the partitioning member 6 by the inclined surface means 65, so that the rotatable member 61 and the vessel 2 are set in a non-coupled state with respect to the rotation in the R2 direction. As a result, a tensile force which produces the rotation in the R4 direction of the hook member 217 such as to cancel the abutment and engagement with the leading end of the supporting member 213 is not produced in the wire 227 through the vessel 2. Thus, the inhibition mechanism 207 inhibits the rotation of the headrest 205 in the forward R3 direction, thereby maintaining the headrest 205 in its normal position.

On the other hand with the vehicle seat 201, when, upon a collision from the rear, a large velocity in the backward direction exceeding a fixed value has occurred in the occupant seated in the seat 203, and the load receiving plate 225 is suddenly rotated about the rotating shaft 77 in the R1 direction, this rotation of the rotating shaft 77 in the R2 direction at the velocity exceeding the fixed value limits the flow of the viscous fluid 3 from the accommodating chamber 4 into the accommodating chamber 5 by the truncated conical passage 105 and the inner annular passage 106 each having a passage cross section determined by the cross section diameter of the annular elastic member 96 which has been greatly deformed elastically. As a result, the rotatable member 61 and the vessel 2 are set in a coupled state with respect to the rotation in the R2 direction through the partitioning member 6. In consequence, such rotation of the rotating shaft 77 in the R2 direction at a velocity exceeding the fixed value causes the vessel 2 to undergo rotation about the supporting shaft 226 in the R2 direction through the rotatable member 61 and the partitioning member 6 by overcoming the resiliency of the coil spring 219. Thus, a tensile force producing the rotation of the hook member 217 so as to cancel the abutment and engagement with the leading end of the supporting member 213 is produced in the wire 227. Hence, the hook member 217 of the inhibition mechanism 207 is rotated about the shaft 216 in the R4 direction so as to cancel the abutment and engagement with the leading end of the supporting member 213, with the result that the headrest 205 is rotated in the R3 direction by being urged by the coil spring 215 so as to hold the occupant's head.

Thus, the vehicle seat 201 has the transmitting mechanism 223 equipped with the damper 1 serving as a switching mechanism whereby the force applied to the backrest 204 in the backward direction of the vehicle at a velocity exceeding a fixed value is transmitted to the inhibition mechanism 207 so as to cancel the inhibition by the inhibition mechanism 107 of the rotation of the headrest 205 in the forward R3 direction, whereas the force applied to the backrest 204 at a velocity of the fixed value or less is not transmitted to the inhibition mechanism 207 so as to maintain the inhibition by the inhibition mechanism 107 of the rotation of the headrest 205 in the forward R3 direction. Therefore, it is possible to positively move the headrest 205 in the forward R3 direction only at the time of such as a collision by properly discriminating the time of such as a collision and the time of a non-collision.

In the example of the above-described seat 201, the resetting of the abutment and engagement of the leading end of the supporting member 213 with respect to the hook member 217 can be effected if, after the movement of the headrest 205 in the forward R3 direction, the headrest 205 is forcibly rotated in the opposite direction to the direction to allow the leading end of the supporting member 213 to slide on an inclined surface of the hook member 217 and to reversely rotate the hook member 217. It should be noted that although the wire 227 is used in the above-described embodiment it is possible to alternatively use a gear mechanism, a rack and pinion mechanism, or the like.

What is claimed is:

1. A damper comprising:
    a vessel;
    a partitioning member which partitions an interior of said vessel into two accommodation chambers for accommodating a viscous fluid in an axial direction of said vessel, and which rotates together with said vessel in a direction about an axis of said vessel and is movable with respect to said vessel in the axial direction of said vessel, said partitioning member having at least one communicating hole formed therein so as to allow the two accommodating chambers inside said vessel to communicate with each other;
    moving force imparting means for imparting to said partitioning member a moving force in one direction in the axial direction by the input of relative rotation in one direction in the direction about the axis of said vessel with respect to said vessel, so that a moving velocity is set to one corresponding to a rotating velocity of that input of rotation;
    resilient means for resiliently urging said partitioning member in another direction in the axial direction with respect to said vessel; and
    flow limiting means for limiting the flow of the viscous fluid in the accommodating chamber on one direction side in the axial direction into the accommodating chamber on another direction side in the axial direction through the communicating hole when the internal pressure of the viscous fluid accommodated in the accommodating chamber on the one direction side in the axial direction has exceeded a fixed value owing to the movement of said partitioning member in the one direction in the axial direction,
    wherein said flow limiting means includes a variable passage forming member having a through hole which, in an end face in the one direction in the axial direction, is open to the accommodating chamber on the one direction side in the axial direction, and fitted to said partitioning member movably in the axial direction in such a manner as to oppose at an end face thereof in the another direction of the axial direction an end face in the one direction in the axial direction of said partitioning member so as to form a cross-section variable passage communicating with, at one end thereof, the through hole and, at another end thereof, the communicating hole in cooperation with the end face in the one direction in the axial direction of said partitioning member; and an annular elastic member surrounding the cross-section variable passage and disposed between the end face in the another direction of the axial direction of said variable passage forming member and the end face in the one direction in the axial direction of said partitioning member, wherein a plurality of communication holes are formed in said partitioning member, and said variable passage forming member has a plate-like portion having the through hole, leg portions formed integrally on the plate-like portion and respectively fitted in the communicating holes, and hook portions which are respectively formed integrally on end portions of the leg portions projecting from the communicating holes so as to prevent the leg portions from coming off the communicating holes.

2. The damper according to claim 1, wherein said moving force imparting means includes a rotatable member disposed in said vessel rotatably in the direction about the axis of said vessel; and inclined surface means having inclined surfaces which are formed between an end face in the one direction in the axial direction of said rotatable member and the end face in the another direction of the axial direction of said partitioning member opposing that end face in the one direction and which are inclined with respect to the axial direction.

3. The damper according to claim 2, wherein said inclined surface means includes a plurality of rotatable member projections formed integrally on the end face in the one direction of said rotatable member projectingly in the one direction in the axial direction, and arranged in the direction about the axis, and a plurality of partitioning member projections formed integrally on the end face in the other direction of said partitioning member projectingly in the another direction of the axial direction, and arranged in the direction about the axis so as to mesh with the rotatable member projections, and wherein the inclined surfaces are formed on the rotatable member projections and the partitioning member projections, respectively, so as to be brought into sliding contact with each other.

4. The damper according to claim 1, wherein said partitioning member has a truncated conical surface in the end face in the one direction in the axial direction, said variable passage forming member has a truncated conical surface which is complementary to the truncated conical surface of said partitioning member and opposes that truncated conical surface, and the cross-section variable passage has a truncated conical passage formed by the truncated conical surface of said partitioning member and the truncated conical surface of said variable passage forming member.

5. The damper according to claim 1, wherein said annular elastic member is constituted by an O-ring formed of natural rubber or synthetic rubber whose modulus of elastic is small at a high temperature and large at a low temperature.

6. A vehicle seat comprising:
a backrest of a vehicle;
a headrest supported by said backrest movably in a forward direction of the vehicle;
movement urging means for urging said headrest to move in the forward direction; and
an inhibition mechanism for inhibiting the movement of said headrest in the forward direction; and
canceling means for canceling the inhibition by said inhibition mechanism of the movement of said headrest in the forward direction when a moving velocity of a force applied to said backrest in a backward direction of the vehicle has exceeded a fixed value,
said canceling means having a load-rotation converting mechanism for converting a load applied to a back receiving portion of said backrest into a rotational force and a transmitting mechanism for transmitting to said inhibition mechanism a force applied to said backrest in the backward direction of the vehicle on the basis of the moving velocity exceeding the fixed value,
said transmitting mechanism having said damper according to claim 1,
wherein one of said vessel and said moving force imparting means of said damper is coupled to said load-rotation converting mechanism so as to receive the rotational force from said load-rotation converting mechanism as an input of rotation, and another one of said vessel and said moving force imparting means of said damper is coupled to said inhibition mechanism so as to transmit to said inhibition mechanism the force applied to said backrest in the backward direction of the vehicle on the basis of the moving velocity exceeding the fixed value.

7. The vehicle seat according to claim 6, wherein said load-rotation converting mechanism has a load receiving plate supported rotatably by a frame of said backrest and disposed in the back receiving portion of said backrest.

8. The vehicle seat according to claim 6, wherein said headrest is supported by said backrest forwardly rotatably, said movement urging means is adapted to urge said headrest to forwardly rotate, and said inhibition mechanism is adapted to inhibit the rotation of said headrest in the forward direction.

9. A damper comprising:
a vessel;
a partitioning member which partitions an interior of said vessel into two accommodation chambers for accommodating a viscous fluid in an axial direction of said vessel, and which rotates together with said vessel in a direction about an axis of said vessel and is movable with respect to said vessel in the axial direction of said vessel, said partitioning member having at least one communicating hole formed therein so as to allow the two accommodating chambers inside said vessel to communicate with each other;
moving force imparting means for imparting to said partitioning member a moving force in one direction in the axial direction by the input of relative rotation in one direction in the direction about the axis of said vessel with respect to said vessel, so that a moving velocity is set to one corresponding to a rotating velocity of that input of rotation;
resilient means for resiliently urging said partitioning member in another direction in the axial direction with respect to said vessel; and
flow limiting means for limiting the flow of the viscous fluid in the accommodating chamber on one direction side in the axial direction into the accommodating chamber on another direction side in the axial direction through the communicating hole when the internal pressure of the viscous fluid accommodated in the accommodating chamber on the one direction side in the axial direction has exceeded a fixed value owing to the movement of said partitioning member in the one direction in the axial direction, wherein said flow limiting means includes a variable passage forming member having a through hole which, in an end face in the one direction in the axial direction, is open to the accommodating chamber on the one direction side in the axial direction, and fitted to said partitioning member movably in the axial direction in such a manner as to oppose at an end face thereof in the another direction of the axial direction an end face in the one direction in the axial direction of said partitioning member so as to form a cross-section variable passage communicating with, at one end thereof, the through hole and, at another end thereof, the communicating hole in cooperation with the end face in the one direction in the axial direction of said partitioning member; and an annular elastic member surrounding the cross-section variable passage and disposed between the end face in the another direction of the axial direction of said variable passage forming member and the end face in the one direction in the axial direction of said partitioning member, wherein said annular elastic member is constituted by an O-ring formed of natural rubber or synthetic rubber whose modulus of elastic is small at a high temperature and large at a low temperature.

10. The damper according to claim 9, wherein said moving force imparting means includes a rotatable member disposed in said vessel rotatably in the direction about the axis of said vessel; and inclined surface means having inclined surfaces which are formed between an end face in the one direction in the axial direction of said rotatable member and the end face in the another direction of the axial direction of said partitioning member opposing that end face in the one direction and which are inclined with respect to the axial direction.

11. The damper according to claim 10, wherein said inclined surface means includes a plurality of rotatable member projections formed integrally on the end face in the one direction of said rotatable member projectingly in the one direction in the axial direction, and arranged in the direction about the axis, and a plurality of partitioning member projections formed integrally on the end face in the other direction of said partitioning member projectingly in the another direction of the axial direction, and arranged in the direction about the axis so as to mesh with the rotatable member projections, and wherein the inclined surfaces are formed on the rotatable member projections and the partitioning member projections, respectively, so as to be brought into sliding contact with each other.

12. The damper according to claim 9, wherein a plurality of communication holes are formed in said partitioning member, and said variable passage forming member has a plate-like portion having the through hole, leg portions formed integrally on the plate-like portion and respectively fitted in the communicating holes, and hook portions which are respectively formed integrally on end portions of the leg portions projecting from the communicating holes so as to prevent the leg portions from corning off the communicating holes.

13. The damper according to claim 9, wherein said partitioning member has a truncated conical surface in the end face in the one direction in the axial direction, said variable passage forming member has a truncated conical surface which is complementary to the truncated conical surface of said partitioning member and opposes that truncated conical surface, and the cross-section variable passage has a truncated conical passage formed by the truncated conical surface of said partitioning member and the truncated conical surface of said variable passage forming member.

14. A vehicle seat comprising:
a backrest of a vehicle;
a headrest supported by said backrest movably in a forward direction of the vehicle;
movement urging means for urging said headrest to move in the forward direction; and
an inhibition mechanism for inhibiting the rotation of said headrest in the forward direction; and
canceling means for canceling the inhibition by said inhibition mechanism of the movement of said headrest in the forward direction when a moving velocity of a force applied to said backrest in a backward direction of the vehicle has exceeded a fixed value,
said canceling means having a load-rotation converting mechanism for converting a load applied to a back receiving portion of said backrest into a rotational force and a transmitting mechanism for transmitting to said inhibition mechanism a force applied to said backrest in the backward direction of the vehicle on the basis of the moving velocity exceeding the fixed value,
said transmitting mechanism having said damper according to claim 10,
wherein one of said vessel and said moving force imparting means of said damper is coupled to said load-rotation converting mechanism so as to receive the rotational force from said load-rotation converting mechanism as an input of rotation, and another one of said vessel and said moving force imparting means of said damper is coupled to said inhibition mechanism so as to transmit to said inhibition mechanism the force applied to said backrest in the backward direction of the vehicle on the basis of the moving velocity exceeding the fixed value.

15. The vehicle seat according to claim 14, wherein said load-rotation converting mechanism has a load receiving plate supported rotatably by a frame of said backrest and disposed in the back receiving portion of said backrest.

16. The vehicle seat according to claim 14, wherein said headrest is supported by said backrest forwardly rotatably, said movement urging means is adapted to urge said headrest to forwardly rotate, and said inhibition mechanism is adapted to inhibit the rotation of said headrest in the forward direction.

* * * * *

UNITED STATES PATENT AND TRADEMARK OFFICE
CERTIFICATE OF CORRECTION

PATENT NO. : 8,191,965 B2
APPLICATION NO. : 12/430381
DATED : June 5, 2012
INVENTOR(S) : Okimura et al.

It is certified that error appears in the above-identified patent and that said Letters Patent is hereby corrected as shown below:

Title Page, item (56), column 2, lines 1-3;
Page 2 of the face of the page of the patent, "OTHER PUBLICATIONS" should be listed as follows:
Microfilm of the specification and drawings annexed to the request of Japanese Utility Model Application No. 17268/1983 (59-123733 Aug. 1984).

Column 18, lines 15-46;
Claim 14, the claim should read:
14. A vehicle seat comprising:
a backrest of a vehicle;
a headrest supported by said backrest movably in a forward direction of the vehicle;
movement urging means for urging said headrest to move in the forward direction; and
an inhibition mechanism for inhibiting the rotation of said headrest in the forward direction; and
canceling means for canceling the inhibition by said inhibition mechanism of the movement of said headrest in the forward direction when a moving velocity of a force applied to said backrest in a backward direction of the vehicle has exceeded a fixed value,
said canceling means having a load-rotation converting mechanism for converting a load applied to a back receiving portion of said backrest into a rotational force and a transmitting mechanism for transmitting to said inhibition mechanism a force applied to said backrest in the backward direction of the vehicle on the basis of the moving velocity exceeding the fixed value,
said transmitting mechanism having said damper according to claim 9,
wherein one of said vessel and said moving force imparting means of said damper is coupled to said load-rotation converting mechanism so as to receive the rotational force from said load-rotation converting mechanism as an input of rotation, and another one of said vessel and said moving force imparting means of said damper is coupled to said inhibition mechanism so as to transmit to said inhibition mechanism the force applied to said backrest in the backward direction of the vehicle on the basis of the moving velocity exceeding the fixed value.

Signed and Sealed this
Thirteenth Day of November, 2012

David J. Kappos
*Director of the United States Patent and Trademark Office*